United States Patent
Smallwood (10) Patent No.: US 10,548,338 B2
(45) Date of Patent: Feb. 4, 2020

(54) USE OF SPENT BLEACHING EARTH FROM EDIBLE OIL PROCESSING IN THE FORMULATION OF SALT AND MINERAL FEED BLOCKS OR PELLETS FOR LIVESTOCK

(71) Applicant: Norman J. Smallwood, Plano, TX (US)

(72) Inventor: Norman J. Smallwood, Plano, TX (US)

(*) Notice: Subject to any disclaimer, the term of this patent is extended or adjusted under 35 U.S.C. 154(b) by 781 days.

(21) Appl. No.: 14/344,803

(22) PCT Filed: Sep. 28, 2012

(86) PCT No.: PCT/US2012/057708
§ 371 (c)(1),
(2) Date: Mar. 13, 2014

(87) PCT Pub. No.: WO2013/052357
PCT Pub. Date: Apr. 11, 2013

(65) Prior Publication Data
US 2014/0356483 A1   Dec. 4, 2014

Related U.S. Application Data

(60) Provisional application No. 61/543,073, filed on Oct. 4, 2011.

(51) Int. Cl.
*B09B 3/00* (2006.01)
*A23K 10/40* (2016.01)
(Continued)

(52) U.S. Cl.
CPC .............. *A23K 10/40* (2016.05); *A23K 20/20* (2016.05); *A23K 20/22* (2016.05); *A23K 20/24* (2016.05);
(Continued)

(58) Field of Classification Search
CPC ........ A23K 10/40; A23K 20/20; A23K 20/24; A23K 20/28; Y02P 60/877; Y02P 60/87; C11B 13/04; B09B 3/0025
See application file for complete search history.

(56) References Cited

U.S. PATENT DOCUMENTS 1,204,551 A   11/1916 Edgerton
2,139,910 A   12/1938 Aaron
(Continued)

FOREIGN PATENT DOCUMENTS

CN   1947542 A   11/2006
CN   102028108   4/2011
(Continued)

OTHER PUBLICATIONS

English Translation of Funabashi et al., JP 2008-237153A; original document published on Oct. 9, 2008.*
(Continued)

*Primary Examiner* — Walter A Moore
(74) *Attorney, Agent, or Firm* — McKee, Voorhees & Sease, PLC (57) ABSTRACT

Spent bleaching earth from edible oil processing can be used in the formulation of salt and mineral lick blocks and pellets for livestock to enhance the health and nutritional value of the feed supplements. Because of the ignition hazard inherent with spent bleaching earth, landfill has been and continues to be the dominant disposal method. By adding salt or brine to the spent bleaching earth upon discharge from the process filters, the hydroscopic property will keep the material safe for handling and economic use as described.

6 Claims, 3 Drawing Sheets

(51) Int. Cl.

| | |
|---|---|
| A23K 40/25 | (2016.01) |
| A23K 40/10 | (2016.01) |
| A23K 40/20 | (2016.01) |
| A23K 20/20 | (2016.01) |
| A23K 20/22 | (2016.01) |
| A23K 20/24 | (2016.01) |
| A23K 20/28 | (2016.01) |
| A23K 50/10 | (2016.01) |

(52) U.S. Cl.
CPC ............. *A23K 20/28* (2016.05); *A23K 40/10* (2016.05); *A23K 40/20* (2016.05); *A23K 40/25* (2016.05); *A23K 50/10* (2016.05); *B09B 3/0025* (2013.01); *Y02P 60/87* (2015.11)

(56) References Cited

U.S. PATENT DOCUMENTS

| | | | |
|---|---|---|---|
| 3,340,065 A * | 9/1967 | Pruckner | A23K 10/37 426/635 |
| 3,794,740 A | 2/1974 | Achorn et al. | |
| 4,171,386 A * | 10/1979 | Skoch | A23K 10/33 426/623 |
| 4,265,916 A | 5/1981 | Skoch et al. | |
| 4,735,809 A | 4/1988 | Donovan et al. | |
| 4,970,080 A | 11/1990 | Laurent et al. | |
| 4,976,963 A | 12/1990 | Schricker et al. | |
| 5,006,361 A | 4/1991 | Cox | |
| 5,073,388 A | 12/1991 | Miller | |
| 5,165,946 A | 11/1992 | Taylor et al. | |
| 5,192,547 A | 3/1993 | Taylor | |
| 5,211,980 A | 5/1993 | Cox | |
| 5,952,024 A | 9/1999 | Theuninck et al. | |
| 6,436,453 B1 | 8/2002 | van Lengerich et al. | |
| 2002/0068118 A1 | 6/2002 | Gombos et al. | |
| 2003/0198730 A1 | 10/2003 | Stewart | |
| 2004/0013709 A1* | 1/2004 | Berger | A23K 30/15 424/442 |
| 2004/0137029 A1* | 7/2004 | Johnson | A01N 25/002 424/405 |
| 2008/0124443 A1 | 5/2008 | Daniels | |
| 2008/0311226 A1 | 12/2008 | Yamka et al. | |
| 2009/0011937 A1 | 1/2009 | Vantieghem et al. | |
| 2009/0077779 A1* | 3/2009 | Zimmerman | A61G 17/08 27/1 |
| 2011/0021461 A1 | 1/2011 | Vazquez-Anon et al. | |
| 2014/0356483 A1 | 12/2014 | Smallwood | |
| 2014/0363538 A1 | 12/2014 | Olinski et al. | |

FOREIGN PATENT DOCUMENTS

| | | | |
|---|---|---|---|
| CN | 102028109 | 4/2011 | |
| GB | 1038389 A * | 8/1966 | A23K 10/37 |
| JP | 06090674 | 4/1994 | |
| JP | 2008237153 | 10/2008 | |
| WO | 84-00668 | 3/1984 | |
| WO | 0101790 | 1/2001 | |
| WO | 2013052357 A2 | 4/2013 | |

OTHER PUBLICATIONS

Van Oss, Background Facts and Issues Concerning Cement and Cement Data, USGS, Open-File Report 2005-1152, U.S. Department of the Interior, available at: https://pubs.usgs.gov/of/2005/1152/2005-1152.pdf, published 2005; accessed on Feb. 3, 2017.*
Small-scale dairy farming manual vol. 3, Food and Agriculture Organization of the United Nations Rome, published 1993, pp. 1-54; available at: ftp://ftp.fao.org/docrep/fao/011/t1265e/t1275e.pdf; accessed on Feb. 3, 2017.*
Liu et al., The effects of urea-mineral lick blocks on the liveweight gain of local yellow cattle and goats in grazing conditions, Livestock Research for Rural Development, vol. 7, No. 2, Dec. 1995, available at: http://www.fao.org/ag/aga/agap/frg/Irrd/Irrd7/2/2.htm, accessed on Feb. 3, 2017.*
Frequently asked questions on Urea-Molasses-Multinutrient Block Technology, available at: https://web.archive.org/web/20081204015352/http://www-naweb.iaea.org/nafa/aph/faq-ummb.pdf; published on Dec. 4, 2008; accessed on Jul. 21, 2017.*
Quikrete, Frequently Asked Questions, Available at: https://web.archive.org/web/20070209045114/https://www.quikrete.com/contactus/faqs.asp; accessed on Sep. 4, 2018; published on Feb. 9, 2007. (Year: 2007).*
Herber, High Early Strength Portland Cement—Its Practical Fields of Use, Presented at 49th Annual Meeting, Hartford, Connecticut , Feb. 21, 1933. (Year: 1933).*
Smallwood, Norman J., PCT/US16/20947, filed Mar. 4, 2016, "The International Search Report and The Written Opinion of the International Searching Authority", dated Aug. 8, 2016, 11 pages.
Dwyer, M.R. et al., "Environment and Health, Effects of Inorganic Adsorbents and Cyclopiazonic Acid in Broiler Chickens", Poultry Science 76:1141-1149 Mar. 12, 1997.
Harvey, Roger B. et al., "Comparison of two hydrated sodium calcium aluminosilicate compounds to experimentally protect growing barrows from aflatoxicosis" J. Vet. Diagn. Invest. 6:88-92 Dec. 31, 1994.
Keith, M.O. et al., "Effects of Feeding Spent Bleaching Clay from Canola Oil Refining to Growing Mice and Rates", Can. J. Anim. Sci. 66: 191-199, Mar. 31, 1986.
Kubena, L F. et al., "Effects of a Hydrated Sodium Calcium Aluminosilicate (T-Blind) on Mycotoxicosis in Young Broiler Chickens" Poultry Science 77: 1502-1509, May 7, 1998.
Ng, Wing-Keong et al., "Evaluation of Spent Bleaching Clay from Palm Oil Refining as an Ingredient for Diets of Red Hybrid Tilapia, Oreochromis sp." Abstract, Journal of Applied Aquaculture, vol. 17, Issue 4, 2005, htpp://www. tandfonline.com/doi/abs/10.1300/J028v17n04_06 [retrieved from the Internet on Oct. 19, 2011.
Jeon, H. Y. et al., "Studies on Evaluation of Spent Bleaching Clay as a Feed Ingredient in Broiler Chicks" Korean J. Poult. Sci, vol. 34, No. 2, pp. 99-104, Jun. 30, 2007.
Smith, T. K. "Spent Canola Oil Bleaching Clays: Potential for Treatment of T-2 Toxicosis in Rats and Short-Term Inclusion in Diets for Immature Swine", Can. J. Anim. Sci, vol. 64, pp. 725-732, Sep. 1984.
Smallwood, Norman J., PCT/US2012/057708, "Notification of Transmittal of International Search Report and the Written Opinion of the International Searching Authority, or the Declaration" dated Mar. 29, 2013.
Smallwood, Norman J., PCT/US2012/057708, "Notification of Transmittal of International Prelinmiary Report on Patentability" dated Jan. 10, 2014.
Al-Zubaidy, "Evaluation of spent bleaching and filtering clay-a bentonite product from palm oil refining as a potential feed ingredient in layer diets" Animal Feed Science and Technology, pp. 13-19. Dec. 1, 1992.
European Patent Office, "Supplementary European Search Report", issued in connection to International Application No. 12838742.0-1357/2763550 and PCT/US2012/057708, 5 pages, dated Mar. 18, 2015.
Mathison et al., "Cement Kiln Dust in an All-Concentrate Diet for Feedlot Steers", Department of Animal Science, Universy of Alberta, (1979), 7 Pages.
Virta, Robert L., "Clay and Shale", U.S. Geological Survey Minerals Yearbook, (2002), 27 Pages.
Hu, Xiaohong, "Utilization of Spent Bleaching Earth", Hournal of Wuhan Food Industry College, No. 1, pp. 34-36 Dec. 31, 1996.
European Patent Office, "Supplemental European Search Report", issued in connection to International Application No. PCT/US2012/057708, 1 page dated Apr. 7, 2015.

(56) References Cited

OTHER PUBLICATIONS

Canadian Intellectual Property Office, "Non-Final Office Action", issued in connection to International Application No. PCT/US2012/057708, 4 pages dated Apr. 24, 2015.
New Zealand Intellectual Property Office, "Further Examination Report", issued in connection wiht International Patent No. 622700, 2 pages dated Jun. 12, 2015.
Chinese Patent Office, "Non-Final Office Action and English translation", issued in connection to Chinese Patent Application No. 201280049355.9, 15 pages dated Apr. 13, 2015.
Applewhite, Thomas, "Proceedings of the World Conference on Oilseed Technology and Utilization", Conference held in Budapest Hungary, 1992.
Eliche-Quesada, D., "Reusing of Oil Industry Waste as Secondary Material in Clay Bricks", Journal of Mineral Metal and Material Engineering, vol. 1, pp. 29-39, 2015.
Hamm et al., "Autoignition of spent bleaching earth", Edible Oil Processing, Second Edition, 10.7.3.2, pp. 305-306, 2013.
Ismadji et al., "Impregnation Clay Minerals with Base and Salts", Clay Materials for Environmental Remediation, 3.1.2, pp. 41-42, 2015.
Krzysko-Lupicka et al., "The effect of spent bleaching earth ageing process on its physicochemical and microbial composition and its potential use as a source of fatty acids and triterpenes", Environ. Sci. Pollut. Res., vol. 21, pp. 10765-10774, May 7, 2014.
Loh et al., "A Study of Residual Oils Recovered from Spent Bleaching Earth: Their Characteristics and Applications", American Journal of Applied Sciences, vol. 3(10), pp. 2063-2067, 2006.
Loh et al., "Surface-active physicochemical characteristics of spent bleaching earth on soil-plant interaction and water-nutrient uptake: A review", Applied Clay Science, vol. 140, pp. 49-65, Jan. 21, 2017.
Mu et al., "Regeneration and Recycling of Spent Bleaching Earth", Handbook of Ecomaterials, 21 pages, 2018.
Nursulihatimarsyila et al., "Deoiling and Regeneration Efficiencies of Spent Bleaching Clay", American Journal of Applied Sciences, vol. 7(3), pp. 434-437, 2010.
Peng et al., "Influence of Chloride-Ion Adsorption Agent on Chloride Ions in Concrete and Mortar", Materials, vol. 7, pp. 3415-3426, Apr. 30, 2014.
Prokopov et al., "Utilization of spent bleaching earth from vegetable oil processing", Ukrainian Food Journal, vol. 2, Issue 4, pp. 489-498, 2013.

\* cited by examiner

USE OF SPENT BLEACHING EARTH FROM EDIBLE OIL PROCESSING IN THE FORMULATION OF SALT AND MINERAL FEED BLOCKS OR PELLETS FOR LIVESTOCK

CROSS-REFERENCE TO RELATED APPLICATIONS

This application claims priority under 35 U.S.C. § 119 to PCT application Serial No. PCT/US12/57708 filed Sep. 28, 2012, which is herein incorporated by reference in its entirety.

FIELD OF THE INVENTION

The present invention relates to the safe handling, disposal, and economic use of spent bleaching earth from edible oil processing by salt addition with the particular application of making animal feed compositions, including lick blocks and pellets for livestock nutrition.

BACKGROUND OF THE INVENTION

Spent Bleaching Earth

Spent bleaching earth is a solid waste material generated as part of the refining process in the vegetable oil industry worldwide. A minimum of 112 million pounds of bleaching earth (clay) are used per year in the United States alone for edible vegetable oil processing. A typical vegetable oil refining process involves pretreatment of crude vegetable oil with acid and/or caustic soda followed by bleaching and deodorization. Bleaching is a process of adsorbing impurities. The most common adsorbent used for bleaching is the bleaching earth or clay. In edible oil refining, the bleaching process is generally considered to be of critical importance in determining the quality and stability of the final product. Although bleaching was originally intended for the removal of coloring substances from the oil, it is now recognized that this process is responsible for the removal of a whole range of impurities. Besides decolorization, the most important purpose of this bleaching process is the removal of trace elements such as iron, copper, calcium, magnesium, nickel, and phosphorus, some of which are known to promote oxidation of the oil and to limit the storage stability of the oil if they are not removed.

The bleaching process is followed by deodorization, which is intended primarily for the removal of traces of constituents that cause flavors and odors. Subsequently, the treated oil is separated from the bleaching earth by filtration. In order to minimize oil losses, the filter cake resulting from the removal of bleaching earth from the oil stream is commonly blown with steam. By weight, oil retention of spent bleaching earth from edible oil processing ranges between about 30-50% entrained edible oil. Thus, there is about 50-70% clay. The edible oil has significant nutritional value for livestock. At a 30% retention level, about 33.6 million pounds per year of edible oil is lost in the spent clay. While the clay component is inert, it is not harmful for ingestion. This is reflected by the fact that clay is added to soybean protein meal as a flow agent for animal feed.

Disposal of spent bleaching clay has been and continues to be a problem due to the spontaneous combustion of the material. With the thin film of oil on the massive surface area of the clay particles, air exposure results in rapid oxidation and generation of sufficient heat to ignite the oil. To avoid this hazard, the most common disposal method is to haul the spent bleaching earth to a landfill site or land farm and immediately cover it with earth to prevent the rapid oxidation. For both solid waste disposal sites and land farming applications, the spent bleaching earth must be immediately covered or adequately mixed with soil upon receipt to exclude contact with air and prevent spontaneous combustion.

Disposal of spent bleaching earth in landfills is not ideal and presents problems. This disposal method is expensive and results in no economic benefit from the oil component. Additionally, there are environmental concerns with the continued use of landfills. Finally, the necessity to dispose of the spent bleaching earth within 24 hours is problematic with respect to safety, transportation, and timing. As a result, many attempts to find a safe and economic use for spent bleaching earth have been contemplated. For over fifty years, numerous ideas for economic utilization of the spent bleaching earth have been explored including inclusion in some liquid animal feeds. These methods have not proven to be satisfactory because of the spontaneous combustion hazard in handling. Furthermore, these methods have not been able to dispose of spent bleaching earth on a large scale and for a sustained period.

Other attempts have included efforts to regenerate the spent bleaching earth by controlling the oxidation, and thereby the temperature due to ignition of the spent bleaching earth, within a fluidized bed. See U.S. Pat. No. 5,256,613. However, regeneration of the spent bleaching earth presents other problems, such as the expense of purchasing and training personnel to operate stationary fluidized beds capable of withstanding temperatures around, or in excess of, about 1000° C. Another problem is that regeneration does not necessarily avoid environmental pollution as the gases released from the combustion may include heavy metals and other pollutants. Therefore, attempts to regenerate spent bleaching earth on a large scale may present high costs due to equipment purchases and pollution controls.

Animal Feed Blocks/Pellets

It is common to feed animals and particularly livestock feed supplements including lick blocks and pellets to improve nutrition and health. It is well-known that animal growth and fertility is limited by the level of nutrients in the feed available for consumption. These concerns arise particularly in animals that graze pasture. Thus, animal growth, health, and fertility can be improved by feeding animals nutritional supplements that are fortified with nutrients such as, lipids and minerals. Attempts to provide such nutrients in feed blocks or pellets have been common. Typical types of feed blocks are salt blocks or salt licks, mineral blocks, protein blocks, and molasses blocks.

Lipids, salts, and minerals are particularly desirable in feed supplements; however, lipids have been difficult to incorporate. Lipids are often in liquid form or some form that exudes or sweats liquid oil and/or grease, particularly in warm temperatures. Thus, lipids can become rancid and decompose. This has greatly limited the manner in which lipids can be fed to animals and stored. Furthermore, when mixed with grains or other dry feed products, lipids not only risk going rancid but can also clump or agglomerate, and thereby disperse non-uniformly in typical feeding mechanisms. This results in packaging, handling, and rationing problems. As many livestock live in warm climates, these problems have greatly limited the incorporation of lipids in livestock diets and has minimized the formulations, mass distribution, and use of lipids in feed supplements. Due to these problems, attempts to incorporate significant amounts of lipids in lick blocks have been unsuccessful because the lipids tend to sweat out of the block and spoil, which destroys the nutritive value of the remaining ingredients in the block. A further problem resulting from the sweating and decomposition of the lipids is that it often causes the blocks to become soft and fall apart.

The United States cattle population is about 96.7 million animals. The average intake of salt per head of cattle is about 20 pounds per year. Thus, the average salt demand for cattle in the United States on an annual basis is about 1.9 billion pounds of salt. Furthermore, feeding adequate levels of trace minerals has been shown to benefit the health status of cattle by improving the immune response and antioxidant status, thereby leading to better animal performance. There is a need for trace minerals that can be incorporated in animal feed for the improved health of the animals. U.S. Patent application 2011/0021461 A1 describes combinations and formulations of various ingredients, including trace minerals, but is still limited by the requirement that the minerals be rationed and mixed into the animal feed. Thus, the labor, time requirements, and expenses associated with feed calculations, rationing, and mixing are not reduced.

Clays such as montmorillonite have previously been incorporated into poultry feed at levels as low as one percent of the animal ratio as in U.S. Pat. No. 3,687,680. Effects accompanying the addition of montmorillonite included increased growth rate and body weight of the chickens and reduced mortality rate. Attapulgite clay has also been incorporated in feed blocks at the levels of 2-6%, as in U.S. Pat. No. 4,735,809. In one study, spent bleaching clay, specifically bentonite, was incorporated into poultry feed pellets and the researchers found that "[u]p to 7.5% spent clay could be included successfully in the diet with no deleterious effects." Blair, R. et al., Poultry Science, 1986 Vol. 65, pp. 2281-2291. The study concluded that "spent bleaching clay could be added to poultry feed at 0.5 to 2% clay." Id. Another study concluded that "up to 4% spent bleaching clay could be included in natural ingredients diets without either beneficial or harmful effects to growing mice or rats." Keith, M. O. et al., Can. J. Anim. Sci., 1986 Vol. 66, pp. 191-199. Despite the findings that spent bleaching earth may be incorporated in animal feed products, there have not been any successful attempts to use spent bleaching earth at higher percentages, such as above 10%, in animal feed products. Furthermore, there have been no successful attempts to incorporate spent bleaching earth in lick blocks as opposed to other feed products.

Accordingly, it is an object of the invention to provide a safe method for disposing of spent bleaching earth.

Additionally, it is an object of the invention to provide a method for disposing of spent bleaching earth where the spent bleaching earth is not deposited in a landfill.

A further object of the invention is to provide a method for large scale disposal of spent bleaching earth that avoids the existing problems and concerns.

A further object of the invention is to provide a method for disposing of spent bleaching earth where the spent bleaching earth can be profitably reused for another application.

A further object of the invention is to provide a method for disposing of spent bleaching earth that uses the spent bleaching earth to create salt lick blocks and pellets.

A further object of this invention is to incorporate spent bleaching earth in salt lick blocks or pellets at weight percentages as high as 35%.

SUMMARY OF THE INVENTION

The present invention provides a novel method for disposing of spent bleaching earth that is economically beneficial and avoids the problems typically associated with its disposal. The present invention prevents spontaneous combustion of the spent bleaching earth beyond the 24-hour safe period to provide more time for economic utilization in a stable product. By adding granulated salt or a brine solution to the spent bleaching earth discharged from the process filters, spontaneous combustion can be eliminated. The material can then be transported in solid form to a production facility for use as a nutritious ingredient in making salt and mineral lick blocks or pellets for livestock. Optionally, other additives may also be included in the mixture.

In a preferred embodiment of the invention, the spent bleaching earth is safely disposed of by mixing it with a salt component to prevent spontaneous combustion and simultaneously or subsequently mixing it with a binding agent composition to form the mixture for animal lick blocks or pellets. In another aspect of the invention the spent bleaching earth is present in the nutritional supplement formulation between about 10-35 wt %, salt component is present between about 50-85 wt %, the binding agent composition is present between about 5-15%, and the mixture contains a minimal amount of water so that it can be poured into molds. In yet another aspect of the invention, the nutritional supplement formulation may contain additional ingredients to support animal nutrition and health needs by taking advantage of the preservative attributes of edible salt.

DETAILED DESCRIPTION OF THE PREFERRED EMBODIMENTS

Figure 1:
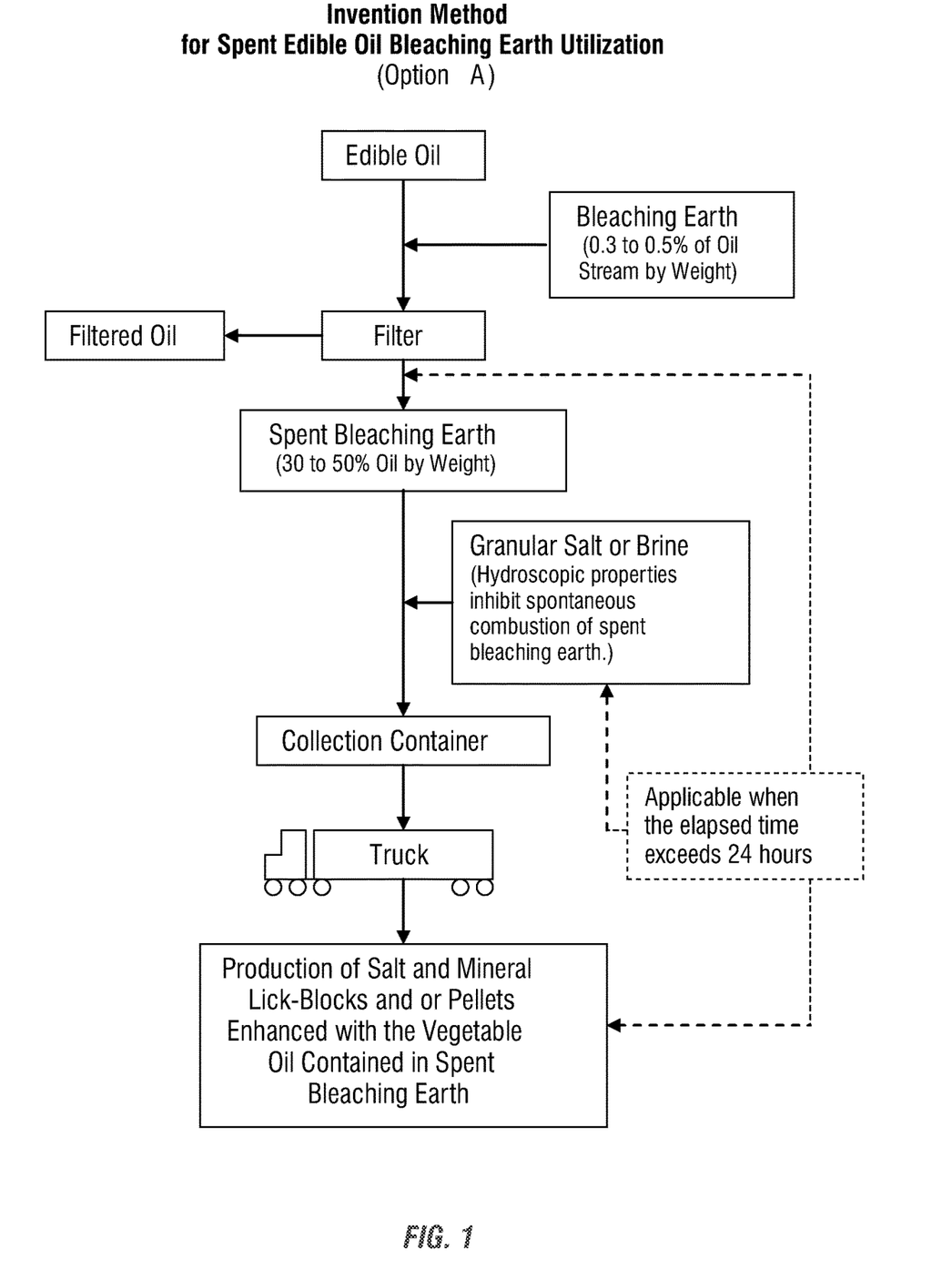
FIG. 1 is a flowchart demonstrating one of the invention methods for utilizing spent edible oil bleaching earth.
Figure 2:
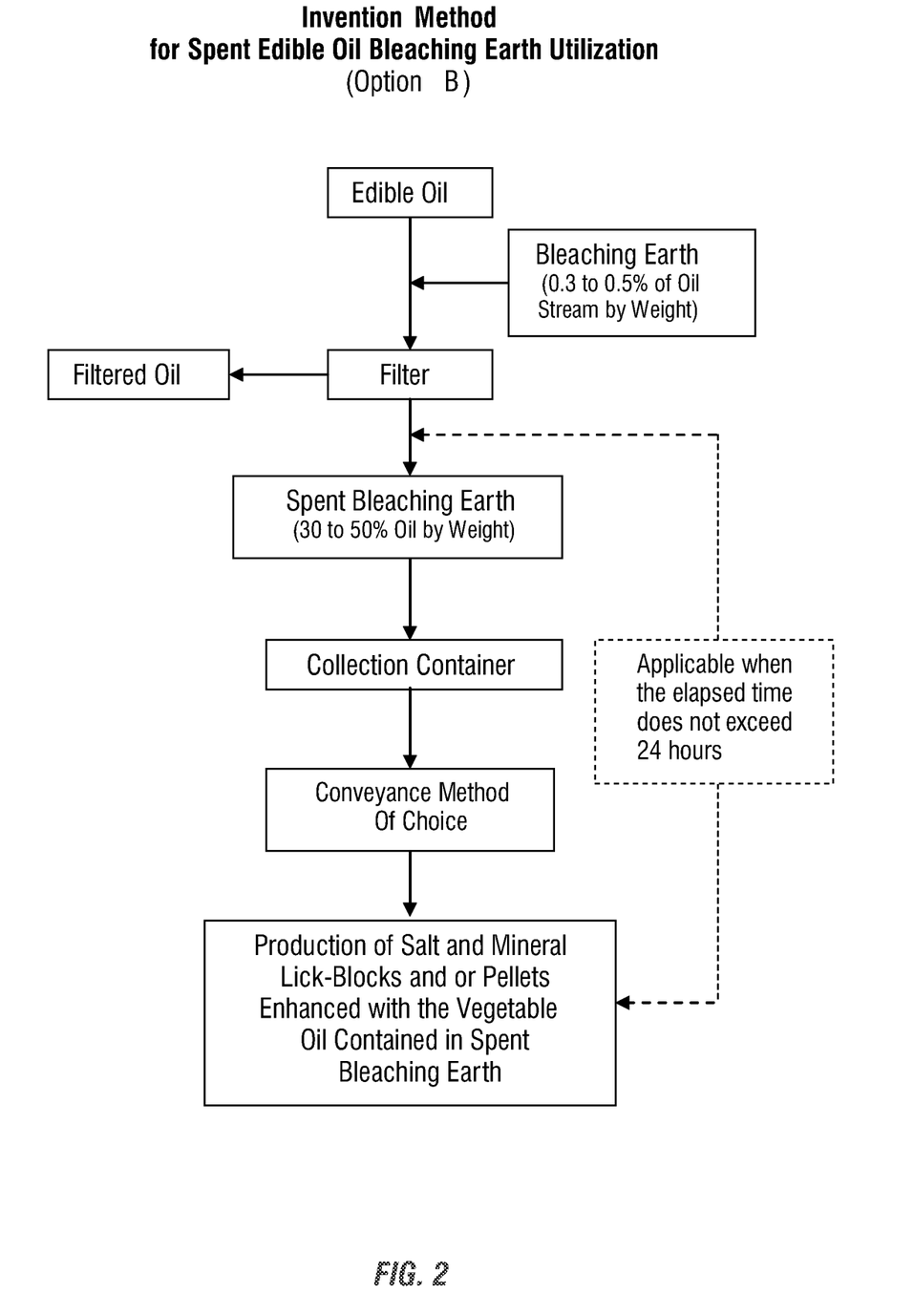
FIG. 2 is a flowchart demonstrating one of the invention methods for utilizing spent edible oil bleaching earth.
Figure 3:
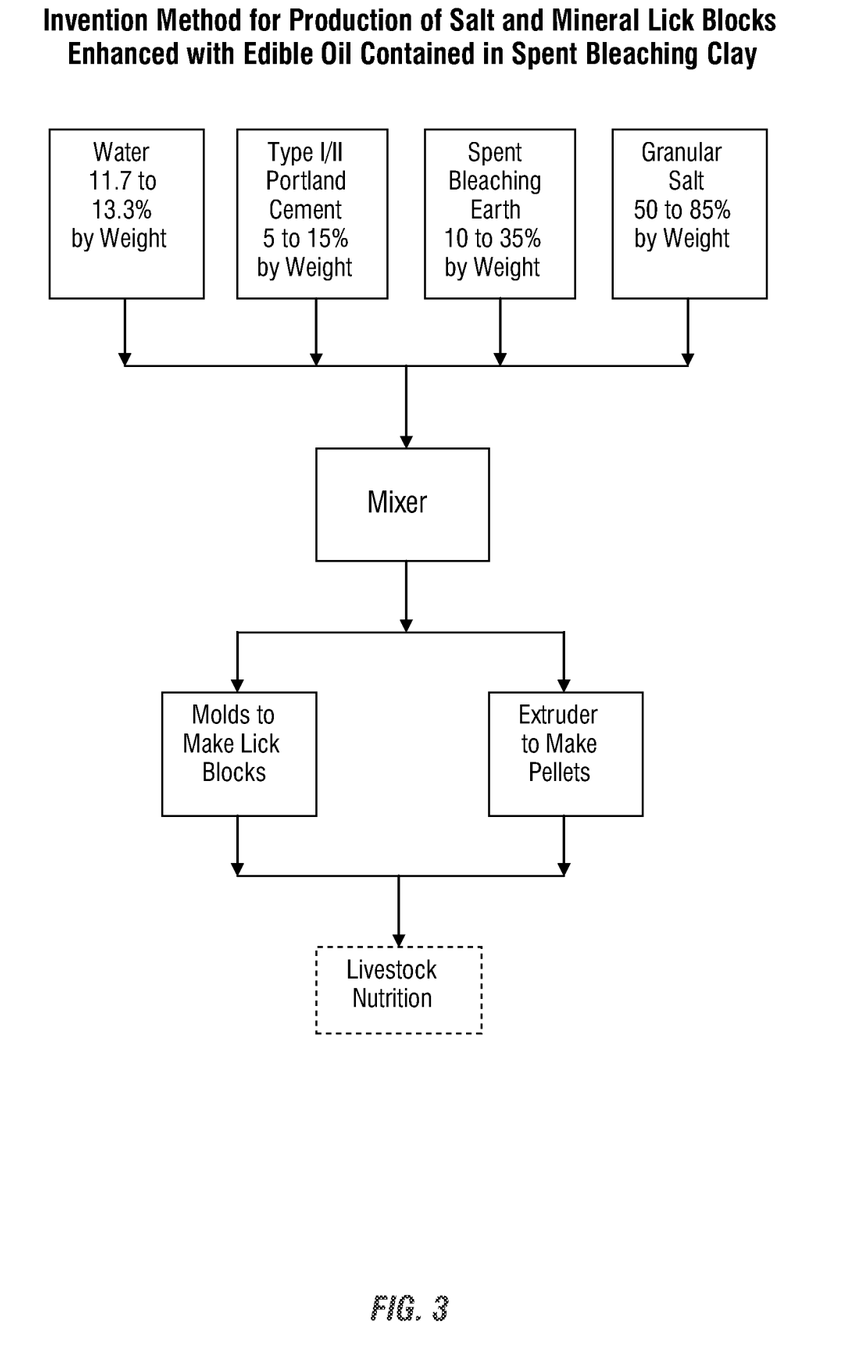
FIG. 3 is a flowchart demonstrating an invention method for production of salt and mineral lick blocks enhanced with edible oil contained in spent bleaching clay.

The embodiments of this invention are not limited to particular animal lick block and pellet compositions and methods of use thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in their SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The terms "weight percent," "wt-%," "wt %" "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Ingredients

Spent Bleaching Earth

The terms "spent bleaching earth," "spent bleaching clay," "edible oil bleaching earth," "edible oil bleaching clay," and variations thereof, as used herein, refer to spent bleaching earth resulting from the production of edible vegetable oil, i.e., oils used chiefly in foodstuffs. Examples of preferred spent bleaching earth are: attapulgite, bentonite, montmorillonite, Na-montmorillonite, Ca-montmorillonite, Na-bentonite, Ca-bentonite, beidellite, nontronite, saponite, hectorite, and combinations thereof. Typical attributes of edible oil bleaching earth are presented in Table 1.

Salt Component

The terms "salt," "salt component," "salt composition," and variations thereof, as used herein, refer to edible salts, which can serve as nutrient sources. Suitable examples of salts include the alkaline earth metal salts (e.g., calcium chloride and magnesium chloride), alkali earth metal salts (e.g., sodium chloride, sodium sulfate, and potassium chloride), copper salts, cobalt salts, chromium salts, selenium salts, manganese salts, and iron salts.

The terms "brine," "brine solution," and variations thereof, as used herein, refer to salt dissolved in water at between about 10 wt % and 50 wt %, preferably between about 10 wt % and 30 wt %, more preferably between about 20 wt % and 30 wt %, most preferably about 24%. The amount and nature of impurities in brine can vary from about 100 to 6,000 ppm. Examples of common impurities are aluminum, iron, magnesium, and sodium compounds.

TABLE 1

Typical Attributes of Edible Oil Bleaching Earth

| Physical Properties | |
| --- | --- |
| Apparent Bulk Density (g/cc) | 0.99 |
| Free Moisture (%) [2 hours, 110° C.] | 10 to 12 |
| Loss on Ignition (%) [pre dried for 2 hours at 1,000° C.] | 6 to 8 |
| Ph [10% suspension filtered] | 5 to 5.3 |
| Acidity (mg KOH/g) | <1 |
| Surface Area (m$^2$/g) | 210 |
| Micro Pore Volume 0-80 nm (mg/l) | 0.46 |
| Chemical Analysis (Mineral Composition by Percentage) | |
| Silicon Oxide | 64 |
| Aluminum Oxide | 16 |
| Iron (III) Oxide | 1.20 |
| Magnesium Oxide | 2.10 |
| Calcium Oxide | 1.20 |
| Sodium Oxide | 0.00 |

TABLE 1-continued

Typical Attributes of Edible Oil Bleaching Earth

| | |
| --- | --- |
| Loss on Ignition (%) | 7.90 |
| Others | 7.60 |
| Particle Size Distribution (Based on Standard Screen Sizes) | |
| 100 | 2 |
| 200 | 9 |
| 240 | 21 |
| 300 | 18 |
| 350 | 12 |
| −350 | 38 |

Source: Fuller's Earth (Clay), Activated Edible Oil Bleaching

Binding Agent

The terms "binding agent," "binding agent composition," and any variations thereof, as used herein, describe a material used to solidify the mixture of spent bleaching earth and salt or brine. Those skilled in the art will be familiar with various binding agents for differing animal feed supplements, i.e., for making lick blocks, pellets, etc. A binding agent including a mineral component is preferred. Examples of suitable binding agents containing a mineral component include Portland cement, particularly Type I/II. Portland cement is commonly used as the binding agent in lick blocks containing soy protein meal and other nutritional ingredients. Methods of making Portland cement and places for purchasing Portland cement are well-known by those skilled in the art. Portland cement contains significant amounts of calcium, which provides nutritional benefits to the animals. The mineralogical composition of Type I/II Portland cement is presented in Table 2. Water may be added to the binding agent composition, as necessary, so that the mixture of spent bleaching earth, salt component, and binding agent may be poured into molds.

TABLE 2

Mineralogical Composition of Type I/II Portland Cement

| Compound Name | Chemical Formula | Percent by weight | |
| --- | --- | --- | --- |
| | | Range | Average |
| Tricalcium Silicate | $Ca_3SiO_5$ | 50-70 | 60 |
| Dicalcium Silicate | $Ca_2SiO_4$ | 10-30 | 20 |
| Tricalcium Aluminate | $Ca_3Al_2O_6$ | 3-13 | 6 |
| Tetracalcium Aluminoferrite | $Ca_4Al_2Fe_2O_{10}$ | 5-15 | 8 |
| Calcium Sulfate | $CaSO_4 \cdot 2H_2O$ | 3-7 | 5 |
| Anhydrous Calcium Sulfate | $CaSO_4$ | 0.2-2.0 | 1 |

Source: H. G. van Oss, 2005, "Background Facts and Issues Concerning Cement and Concrete Data, U.S. Geological Survey Open-File Report 2005-1152: Version 1.2", available at http://pubs.usgs.gov/of/2005/1152/2005-1152.pdf Optional Ingredients The animal feed supplement mixture may also include other optional ingredients. Optionally, other edible fats may be added to the mixture. Optional edible fat sources include, but are not limited to, fatty acids (e.g., stearic, palmitic, oleic, linoleic, and lauric acid), complex lipids (e.g., phospholipids). Sources of edible fats may include, but are not limited to, coconut oil, corn oil, cottonseed oil, fish oil, olive oil, palm oil, sesame oil, soybean oil, canola oil, sunflower seed oil, tallow, greases, beef fat, restaurant fats, and mixtures thereof.

Optionally, other feedstuffs may be added to the mixture, including but not limited to, cottonseed meal, soy bean meal, mill run, lupins, molasses, dunder, other molasses byproducts (dried); grains, cereals, legumes, straw, hay, soy flakes, dried alfalfa, soy meal, wheat middlings, corn; barley meal, blood meal, dried buttermilk, linseed meal, meat and bone meal, peanut meal, rice meal, and sunflower meal.

Optionally, dietary nitrogen may be included in the mixture. Optional dietary nitrogen sources include, but are not limited to, ammonia, ammonium polyphosphate, animal protein products, oilseed meals, synthetic amino acids, and urea.

Optionally, various vitamins may be added to the mixture. Examples of such vitamins include, but are not limited to, vitamins A, E, K, and the B group vitamins.

Optionally, various trace minerals and elements may be added to the mixture. Examples of such trace minerals and elements include, but are not limited to, cobalt sulfate, copper sulfate, ferrous sulfate, ferrous oxide, iodines, manganese sulfate, potassium iodate, selenium and its compounds, sulphur, zinc oxide, and zinc sulfate, etc.

Optionally, various drugs, medicaments, insecticides, enzymes, antimicrobials, probiotics and the like may be added to the mixture.

Optionally, water may be added to the mixture, as necessary, so that the mixture may be poured into molds.

Depending on the optional ingredients added, it may be beneficial to include optional emulsifying agents to stabilize the composition and prevent separation of the mixture, particularly of the fat ingredient(s). A preferred, although not exclusive, example of emulsifying agents are colloidal clay gellants, such as, attapulgite, bentonite, and sepiolite. One of skill in the art will be familiar with the use of emulsifying agents, including when they are helpful and how to incorporate them.

Methods of the Invention and Preferred Embodiments

Prepartion of the Mixture

A mixture is prepared of spent bleaching earth, containing about 30-50 wt % oil, and a salt component. The spent bleaching earth may be present at about 10-35 wt %, preferably about 20-35 wt %, more preferably about 35 wt %. The salt component is present at about 5-85 wt %, preferably 50-85 wt %, and more preferably about 50 wt %. The mixture of spent bleaching earth and salt component is then mixed with a binding agent. The binding agent may be present at about 5-15 wt %, preferably about 15 wt %. Preferably the binding agent includes a mineral component. Most preferably, the binding agent is Type I/II Portland cement. Any suitable mixer can be used to combine and thoroughly mix the ingredients. Examples of suitable mixers include, but are not limited to, variable-speed shop drill motors with a mixer bit, paddle-mixers, etc. One of skill in the art will be familiar with various mixers and can select an appropriate mixer for their particular production needs. Once thoroughly mixed, the mixture is transferred to a mold with the desired size and shape. The mixture should be allowed to set until it has hardened. One of skill in the art will recognize how long the mixture must set to harden.

The methods, products, and compositions of the invention may be followed to provide nutritional supplements in the form of pellets and lick blocks. One of skill in the art may produce pelletized nutritional supplements following the disclosure herein and using pelletizing techniques well-known in the art. Lick blocks, however, are preferred because they provide free-choice feeding to the animals on a self-demand basis and reduce labor and expenses resulting from rationing and mixing granular materials in the animal feed. Additionally, lick blocks can be weather resistant, which removes the need to provide sheltered feeding locations. The lick blocks are also easily transported from one location to another without the risk of spilling.

Additionally, the lipid content in the spent bleaching clay has health benfits for the livestock. In cases where livestock producers have leased pasture land to edible oil processors for disposal of spent bleaching earth, it has been observed that cattle immediately lick on any small quantities spilled. There is no question that livestock will not be attracted to and nutritionally benefit from this incorporation of spent bleaching earth in salt and mineral lick blocks or pellets.

Spontaneous Combustion Suppression Tests

Spontaneous combustion suppression tests were conducted to ensure that the hazards associated with the combustion of spent bleaching earth were eliminated. The tests were conducted as discussed below and the data from the tests is contained in Table 3. Five pound samples of spent bleaching earth containing about 30% oil by weight were mixed with salt component as presented in Table 3, and under the procedures described below.

TABLE 3

Spontaneous Combustion Suppression Test Formulations

| Amount of Spent Bleaching Earth | Weight Percentage of Salt | Salt Component Form and Composition |
|---|---|---|
| 5 lbs | 0% (reference) | No Salt Added |
| 5 lbs | 5% | 24% (wt) brine, NaCl |
| 5 lbs | 5% | Dry NaCl |
| 5 lbs | 7.5% | 24% (wt) brine, NaCl |
| 5 lbs | 7.5% | Dry NaCl |
| 5 lbs | 10% | 24% (wt) brine, NaCl |
| 5 lbs | 10% | Dry NaCl |
| 5 lbs | 15% | Dry NaCl |
| 5 lbs | 18% | Dry NaCl |

All of the five-pound samples were placed outside on a gravel roadway in the direct sunlight for five days. To retain the heat produced from oil oxidation and protect the samples from moisture, the sample bags were closed and tied at the end of each test day and opened again each morning. The temperature of each sample was taken by means of a non-contact infrared thermometer. The temperature recordings are provided in Table 4 by sample.

TABLE 4

Temperature Profile of Spent Bleaching Earth Samples with Salt Addition over Five-Day Period

| | Date | | | | | | | | | |
|---|---|---|---|---|---|---|---|---|---|---|
| | Jul. 24, 2012 | | Jul. 25, 2012 | | Jul. 26, 2012 | | Jul. 27, 2012† | | Jul. 28, 2012 | |
| | Time | | | | | | | | | |
| | 1100 | 1500 | 1100 | 1500 | 1100 | 1500 | 1100 | 1500 | 1100 | 1500 |
| | Temperature (° F.) | | | | | | | | | |
| Reference Sample (0% Salt) | 119 | 130 | 154 | 167 | 169 | 170 | 163 | 151 | 148 | 152 |

TABLE 4-continued

Temperature Profile of Spent Bleaching Earth Samples with Salt Addition over Five-Day Period

| | Jul. 24, 2012 | | Jul. 25, 2012 | | Jul. 26, 2012 | | Jul. 27, 2012† | | Jul. 28, 2012 | |
|---|---|---|---|---|---|---|---|---|---|---|
| | 1100 | 1500 | 1100 | 1500 | 1100 | 1500 | 1100 | 1500 | 1100 | 1500 |
| | | | | | Temperature (° F.) | | | | | |
| Sample with 5% Salt (Brine) | 86* | 111 | 121 | 128 | 130 | 133 | 121 | 128 | 126 | 129 |
| Sample with 5% Dry Salt | — | 96 | 132 | 140 | 147 | 150 | 142 | 137 | 135 | 140 |
| Sample with 7.5% Salt (Brine) | — | 94 | 118 | 125 | 128 | 130 | 117 | 124 | 121 | 125 |
| Sample with 7.5% Dry Salt | — | 95 | 129 | 137 | 142 | 145 | 139 | 134 | 132 | 137 |
| Sample with 10% Salt (Brine) | 86* | 94 | 113 | 121 | 124 | 128 | 115 | 121 | 119 | 121 |
| Sample with 10% Dry Salt | — | 87 | 124 | 133 | 139 | 142 | 136 | 131 | 129 | 133 |
| Sample with 15% Dry Salt | — | 84* | 115 | 126 | 135 | 136 | 131 | 126 | 124 | 129 |
| Sample with 18% Dry Salt | — | 84* | 113 | 124 | 133 | 135 | 129 | 124 | 122 | 126 |
| Ambient Temperature | 88 | 92 | 89 | 91 | 87 | 89 | 86 | 84 | 89 | 92 |
| % Humidity (High) | 94 | | 94 | | 97 | | 94 | | 91 | |
| % Humidity (Low) | 73 | | 79 | | 83 | | 79 | | 78 | |

*The temperature recording reflects the sample temperature at the conclusion of preparation and being placed outside for observation.
†Rain occurred on Jul. 27, 2012, which resulted in an ambient temperature drop. The samples were protected from rain exposure.

In the combustion suppression test, none of the spent bleaching earth samples exhibited any visible ignition over the five-day test period. The reference sample did reach a maximum temperature of 170° F. on the second day of observation and reflected a color change from yellow-tan to brown with some ashen-colored spots. The next highest sample temperature recorded was 150° F. on the second day of observation. This sample had been treated with 5% by weight of dry salt. With salt being hydroscopic, moisture is absorbed from the air to aid in keeping the spent bleaching earth cool. Additionally, the encapsulation of spent bleaching earth within a salt-Portland cement crystal matrix essentially eliminates air exposure and the risk of spontaneous combustion of the entrained edible oil. Thus, the addition of the salt component to the spent bleaching earth prevents significant increases in the temperature of the spent bleaching earth and eliminates the problem of spontaneous combustion.

Spent bleaching earth was disposed of according to the methods disclosed herein and animal nutritional supplements were produced. Four illustrative examples are discussed below. These examples are not to be deemed exclusive embodiments of the methods for disposing of spent bleaching earth, methods of producing the animal nutritional supplements, or compositions of animal nutritional supplement, disclosed herein.

Example 1

Two animal lick block samples were prepared—a 1.573 liter rectangular-shaped block and a 4.732 liter bell-shaped block. A blend of attapulgite and bentonite spent bleaching earth from edible oil processing was obtained and combined with salt, Portland cement Type I/II, and water. The proportions combined were: 10 wt % spent bleaching earth, 85 wt % salt, 5 wt % Portland cement Type I/II, and 300 mL of water for the 1.573 liter block and 900 mL of water for the 4.732 liter block. A variable-speed shop drill motor with a mixer bit was used to thoroughly mix the ingredients. After thorough mixing, each mixture was transferred to a lick block mold. At this point, the mixtures had the color and consistency of concrete or mortar. The mixtures were allowed to set overnight in the molds. After setting overnight, the mixtures hardened and white salt crystals dominated their appearance. The 4.732 liter block was cured for ten days. The 1.573 liter block was cured for one week. During the curing period, the temperature of the blocks was monitored with a non-contact infrared thermometer. The blocks exhibited stable temperatures over the curing period. After the curing period, the lick blocks were off-white in color and had typical attributes of a salt lick block. The blocks were firm and structurally stable. The 4.732 liter lick block was provided to a cattle producer for consumption by a herd of cattle. The block was placed in an outdoor serving dish and observed by personnel onsite. The 4.732 liter lick block exhibited no abnormal or deleterious characteristics. The 1.573 liter block was retained for longer observation. The 1.573 liter lick block exhibited no abnormal or deleterious characteristics.

Example 2

Again, two animal lick block samples were prepared—a 1.573 liter rectangular-shaped block and a 4.732 liter bell-shaped block. A blend of attapulgite and bentonite spent bleaching earth from edible oil processing was obtained and combined with salt, Portland cement Type I/II, and water. The proportions combined were: 15 wt % spent bleaching earth, 75 wt % salt, 10 wt % Portland cement Type I/II, and 300 mL of water for the 1.573 liter block and 900 mL of water for the 4.732 liter block. A variable-speed shop drill motor with a mixer bit was used to thoroughly mix the ingredients. After thorough mixing, each mixture was transferred to a lick block mold. At this point, the mixtures had the color and consistency of concrete or mortar. The mixtures were allowed to set overnight in the molds. After setting overnight, the mixtures hardened and white salt crystals dominated their appearance. The 4.732 liter block was cured for ten days. The 1.573 liter block was cured for one week. During the curing period, the temperature of the blocks was monitored with a non-contact infrared thermometer. The blocks exhibited stable temperatures over the curing period. After the curing period, the lick blocks were off-white in color and had typical attributes of a salt lick block. The blocks were firm and structurally stable. The 4.732 liter lick block was provided to a cattle producer for consumption by a herd of cattle. The block was placed in an outdoor serving dish and observed by personnel onsite. The 4.732 liter lick block exhibited no abnormal or deleterious characteristics. The 1.573 liter block was retained for longer observation. The 1.573 liter lick block exhibited no abnormal or deleterious characteristics.

Example 3

Again, two animal lick block samples were prepared—a 1.573 liter rectangular-shaped block and a 4.732 liter bell-shaped block. A blend of attapulgite and bentonite spent bleaching earth from edible oil processing was obtained and combined with salt, Portland cement Type I/II, and water. The proportions combined were: 20 wt % spent bleaching earth, 65 wt % salt, 15 wt % Portland cement Type I/II, and 300 mL of water for the 1.573 liter block and 900 mL of water for the 4.732 liter block. A variable-speed shop drill motor with a mixer bit was used to thoroughly mix the ingredients. After thorough mixing, each mixture was transferred to a lick block mold. At this point, the mixtures had the color and consistency of concrete or mortar. The mixtures were allowed to set overnight in the molds. After setting overnight, the mixtures hardened and white salt crystals dominated their appearance. The 4.732 liter block was cured for ten days. The 1.573 liter block was cured for one week. During the curing period, the temperature of the blocks was monitored with a non-contact infrared thermometer. The blocks exhibited stable temperatures over the curing period. After the curing period, the lick blocks were off-white in color and had typical attributes of a salt lick block. The blocks were firm and structurally stable. The 4.732 liter lick block was provided to a cattle producer for consumption by a herd of cattle. The block was placed in an outdoor serving dish and observed by personnel onsite. The 4.732 liter lick block exhibited no abnormal or deleterious characteristics. The 1.573 liter block was retained for longer observation. The 1.573 liter lick block exhibited no abnormal or deleterious characteristics.

Example 4

Again, two animal lick block samples were prepared—a 1.573 liter rectangular-shaped block and a 4.732 liter bell-shaped block. A blend of attapulgite and bentonite spent bleaching earth from edible oil processing was obtained and combined with salt, Portland cement Type I/II, and water. The proportions combined were: 35 wt % spent bleaching earth, 50 wt % salt, 15 wt % Portland cement Type I/II, and 350 mL of water for the 1.573 liter block and 1050 mL of water for the 4.732 liter block. A variable-speed shop drill motor with a mixer bit was used to thoroughly mix the ingredients. After thorough mixing, each mixture was transferred to a lick block mold. At this point, the mixtures had the color and consistency of concrete or mortar. The mixtures were allowed to set overnight in the molds. After setting overnight, the mixtures hardened and white salt crystals dominated their appearance. The 4.732 liter block was cured for ten days. The 1.573 liter block was cured for one week. During the curing period, the temperature of the blocks was monitored with a non-contact infrared thermometer. The blocks exhibited stable temperatures over the curing period. After the curing period, the lick blocks were off-white in color and had typical attributes of a salt lick block. The blocks were firm and structurally stable. The 4.732 liter lick block was provided to a cattle producer for consumption by a herd of cattle. The block was placed in an outdoor serving dish and observed by personnel onsite. The 4.732 liter lick block exhibited no abnormal or deleterious characteristics. The 1.573 liter block was retained for longer observation. The 1.573 liter lick block exhibited no abnormal or deleterious characteristics.

What is claimed is:

1. A method for disposing of spent bleaching earth consisting of:
    providing a spent bleaching earth composition consisting essentially of 35 wt. % of spent bleaching earth obtained from edible oil processing with 50 wt. % sodium chloride and 15 wt. % of a binding agent comprising Portland cement;
    mixing the spent bleaching earth, sodium chloride, and binding agent with water to form a mixture;
    allowing the mixture to set; and
    curing the mixture for 7 to 10 days to form a stable crystal matrix block;
    wherein the spent bleaching earth contains 30 wt. % to 50 wt. % oil;
    wherein the mixture is not spontaneously combustible at atmospheric temperatures.

2. The method of claim 1, wherein the spent bleaching earth is selected from the group consisting of attapulgite, montmorillonite, Na-montmorillonite, Ca-montmorillonite, bentonite, Na-bentonite, Ca-bentonite, beidellite, nontronite, saponite, hectorite, or combinations of thereof.

3. A method for preparing animal feed supplements consisting of:
    providing a spent bleaching earth composition consisting essentially of 35 wt. % of spent bleaching earth obtained from edible oil processing with 50 wt. % sodium chloride and 15 wt. % of a binding agent comprising Portland cement;
    mixing the spent bleaching earth, sodium chloride, and binding agent with water to form a mixture;
    allowing the mixture to set; and
    curing the mixture for 7 to 10 days to form a stable crystal matrix block;
    wherein the spent bleaching earth contains 30 wt. % to 50 wt. % oil;
    wherein the mixture is not spontaneously combustible at atmospheric temperatures.

4. The method of claim 3, wherein the spent bleaching earth is selected from the group consisting of attapulgite, montmorillonite, Na-montmorillonite, Ca-montmorillonite, bentonite, Na-bentonite, Ca-bentonite, beidellite, nontronite, saponite, hectorite, or combinations of thereof.

5. The method of claim 3, wherein said Portland cement is Type I/II.

6. The method of claim 3, wherein said animal feed supplement is a lick block.

* * * * *